US008102545B2

(12) United States Patent
Nanno et al.

(10) Patent No.: US 8,102,545 B2
(45) Date of Patent: Jan. 24, 2012

(54) IMAGE FORMING APPARATUS

(75) Inventors: Shigeo Nanno, Kyoto (JP); Takuji Takahashi, Kanagawa (JP); Takamasa Shiraki, Kanagawa (JP); Takaaki Hagihara, Kanagawa (JP); Takayuki Andoh, Kanagawa (JP); Yoshihide Ohta, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1143 days.

(21) Appl. No.: 11/790,176

(22) Filed: Apr. 24, 2007

(65) Prior Publication Data

US 2007/0279888 A1 Dec. 6, 2007

(30) Foreign Application Priority Data

May 30, 2006 (JP) ................................ 2006-149546
Feb. 16, 2007 (JP) ................................ 2007-036220

(51) Int. Cl.
*G06K 15/00* (2006.01)
*G06F 3/12* (2006.01)

(52) U.S. Cl. ....................................... 358/1.12; 358/1.1

(58) Field of Classification Search .................. 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS 6,690,901 B2 2/2004 Katsuyama et al.
2004/0114958 A1 6/2004 Katsuyama et al.
2004/0234292 A1 11/2004 Sato et al.
2006/0008282 A1 * 1/2006 Aratachi et al. ................ 399/33
2007/0147940 A1 * 6/2007 Hattori .......................... 400/624

FOREIGN PATENT DOCUMENTS

JP 63-66848 5/1988
JP 11-164076 6/1999
JP 2001-130089 5/2001
JP 2002-082590 3/2002
JP 2004-347720 12/2004
JP 2005-167801 6/2005
JP 2005-242267 9/2005
JP 2006-065188 3/2006
JP 2006065188 A * 3/2006

* cited by examiner

*Primary Examiner* — Thierry Pham

(74) *Attorney, Agent, or Firm* — Harness, Dickey & Pierce, P.L.C.

(57) ABSTRACT

An upper frame member is pivotally attached to an apparatus body so as to pivot between a closed position and an open position. The apparatus body is closed when the upper frame member is in the closed position, and the apparatus body is opened to expose an image forming unit when the upper frame member is in the open position. A locking member locks the upper frame member to the apparatus body when the upper frame member is in the closed position. An operation member positioned on a sheet stacking surface releases the locking member to unlock the upper frame member from the apparatus body.

36 Claims, 10 Drawing Sheets

IMAGE FORMING APPARATUS

CROSS-REFERENCE TO RELATED APPLICATIONS

The present document incorporates by reference the entire contents of Japanese priority documents, 2006-149546 filed in Japan on May 30, 2006 and 2007-036220 filed in Japan on Feb. 16, 2007

BACKGROUND OF THE INVENTION

1. Field of the Invention

The present invention relates to an image forming apparatus.

2. Description of the Related Art

An image forming apparatus that includes an image forming unit, and a scanner as an image reading unit is widely known. For example, Japanese Patent Application Laid-open No. 2006-65188 discloses an image forming apparatus that includes an image forming unit, a scanner supported above the image forming unit, a discharging unit configured to discharge sheets from the back side to the front side of the image forming unit, and a discharged-sheet tray for stacking the sheets discharged by the discharging unit. The scanner and the discharged-sheet tray are rotated individually to facilitate maintenance work inside the image forming unit.

Japanese Patent Application Laid-open No. 2005-242267 discloses an image forming apparatus that includes an image forming unit, a scanner supported above the image forming unit, a discharging unit configured to discharge sheets from the back side to the front side of the image forming apparatus, and a discharged-sheet tray for stacking the sheets discharged by the discharging unit. The scanner and the discharged-sheet tray are rotated integrally to facilitate maintenance work inside the image forming unit.

Japanese Patent No. 3356172 discloses an image forming apparatus that includes an image forming unit, a scanner rotatably supported above the image forming unit such that a space for discharging sheets is formed between the image forming unit and the scanner, and a discharging unit configured to discharge sheets from the front side to the back side of the image forming apparatus. The image forming apparatus further includes a front part that is rotated to fix a paper jam.

In the image forming apparatuses disclosed in Japanese Patent Application Laid-open Nos. 2006-65188 and 2005-242267, the discharging unit is positioned on the back side of the image forming apparatus and sheets are discharged from the back side and stacked on the front side. For this reason, short sheets are discharged on the discharged-sheet tray on the middle or back side, and thus, not taken easily from the discharged-sheet tray.

In the image forming apparatus disclosed in Japanese Patent Application Laid-open No. 2006-65188, the replacement of consumed parts requires troublesome operations such as holding up the scanner first and then opening the discharged-sheet tray. Furthermore, the structure increases the number of parts of the image forming apparatus, thus increasing the cost.

In the image forming apparatus disclosed in Japanese Patent Application Laid-open No. 2005-242267, the scanner and the discharged-sheet tray are configured to rotate integrally. With the structure, even when sheets are present on the discharged-sheet tray, the maintenance work inside the image forming apparatus can be performed. However, the image forming apparatus needs a pressing member to press sheets on the discharged-sheet tray to prevent the sheets from falling off the discharged sheet-tray when the scanner and the discharged-sheet tray are rotated. Such a pressing member increases the cost and restricts the size (the length in a direction in which sheets are discharged) and number of sheets stacked on the limited space between the scanner and the discharged-sheet tray. As a result, miniaturization of the image forming apparatus cannot be achieved.

In the image forming apparatuses disclosed in Japanese Patent Application Laid-open Nos. 2006-65188 and 2005-242267, sheets are transferred on the back side of the image forming apparatus, and then discharged to the discharged-sheet tray after being. Therefore, if a paper jam occurs inside the image forming apparatus, a back cover has to be opened to fix the paper jam. For this reason, a space is required behind the image forming apparatus to open the cover.

Meanwhile, the discharging unit of the image forming apparatus disclosed in Japanese Patent No. 3356172 is positioned on the front side of the image forming apparatus, and sheets are discharged from the front side and stacked on the back side of the image forming apparatus. This structure requires troublesome operations for maintenance work. For example, to replace consumed parts, a transferring unit in front of the parts needs to be taken out of the image forming apparatus from the opened front cover.

SUMMARY OF THE INVENTION

It is an object of the present invention to at least partially solve the problems in the conventional technology.

According to an aspect of the present invention, an image forming apparatus includes an apparatus body, an image forming unit that forms an image on a recording medium and is housed in the apparatus body, a frame member that is pivotally attached to the apparatus body to pivot between a closed position and an open position, the frame member closing the apparatus body in the closed position and exposing the image forming unit from the apparatus body in the open position, a reading unit that reads an original image and is located above the apparatus body, a stacking member that has a stacking surface for stacking recording media discharged from the image forming unit and is located between the apparatus body and the reading unit, a locking member that locks the frame member to the apparatus body when the frame member is in the closed position, and an operation member that is configured to release the locking member to unlock the frame member from the apparatus body and is located on the stacking surface.

According to another aspect of the present invention, an image forming apparatus includes an apparatus body, image forming means for forming an image on a recording medium, which is housed in the apparatus body, a frame member that is pivotally attached to the apparatus body so as to pivot between a closed position and an open position, the frame member closing the apparatus body in the closed position and exposing the image forming means from the apparatus body in the open position, reading means for reading an original image, which is located above the apparatus body, a stacking member that has a stacking surface for stacking recording media discharged from the image forming means, and that is located between the apparatus body and the reading means, locking means for locking the frame member to the apparatus body when the frame member is in the closed position, and operation means for releasing the locking means to unlock the frame member from the apparatus body, which is located on the stacking surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
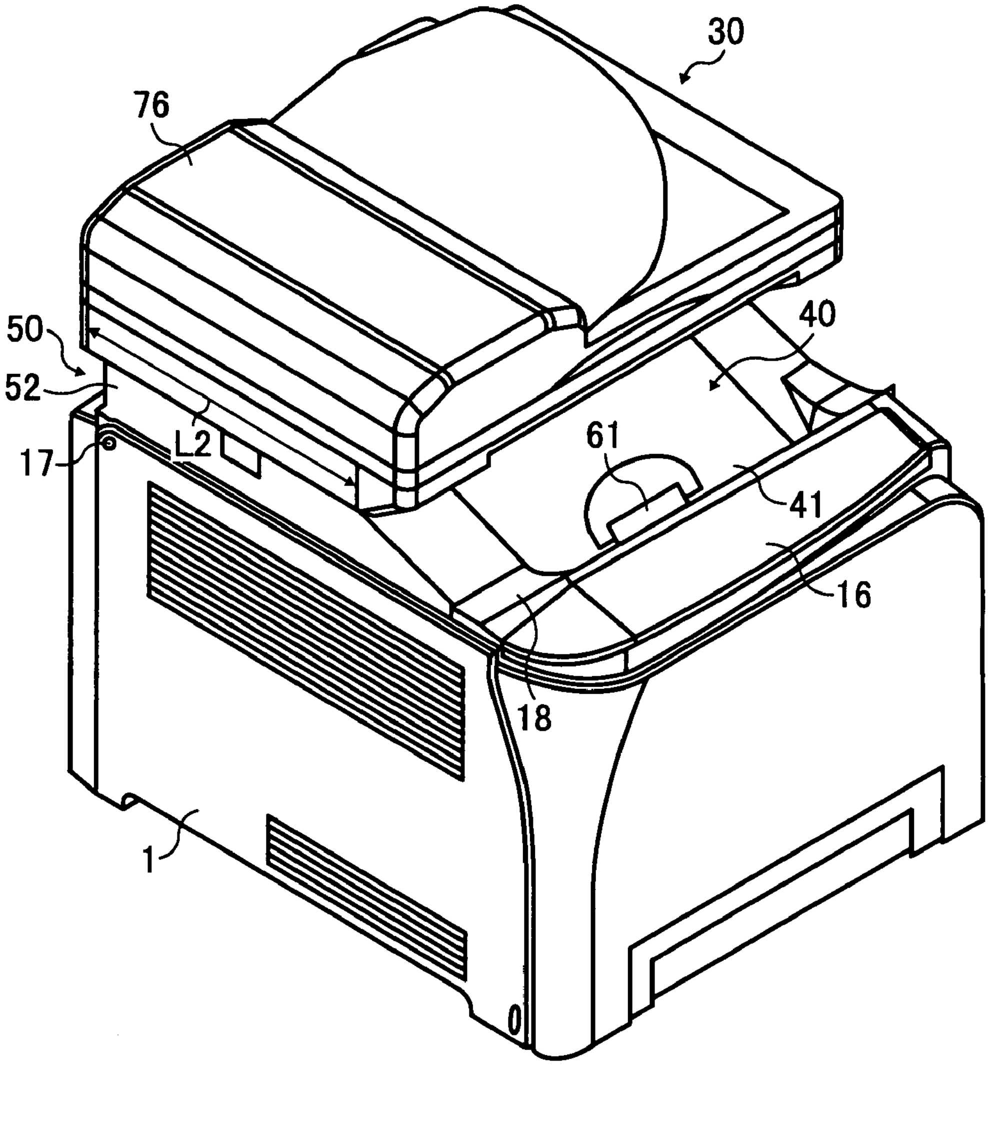
FIG. 1 is a perspective view of an image forming apparatus according to an embodiment of the present invention.
Figure 2:
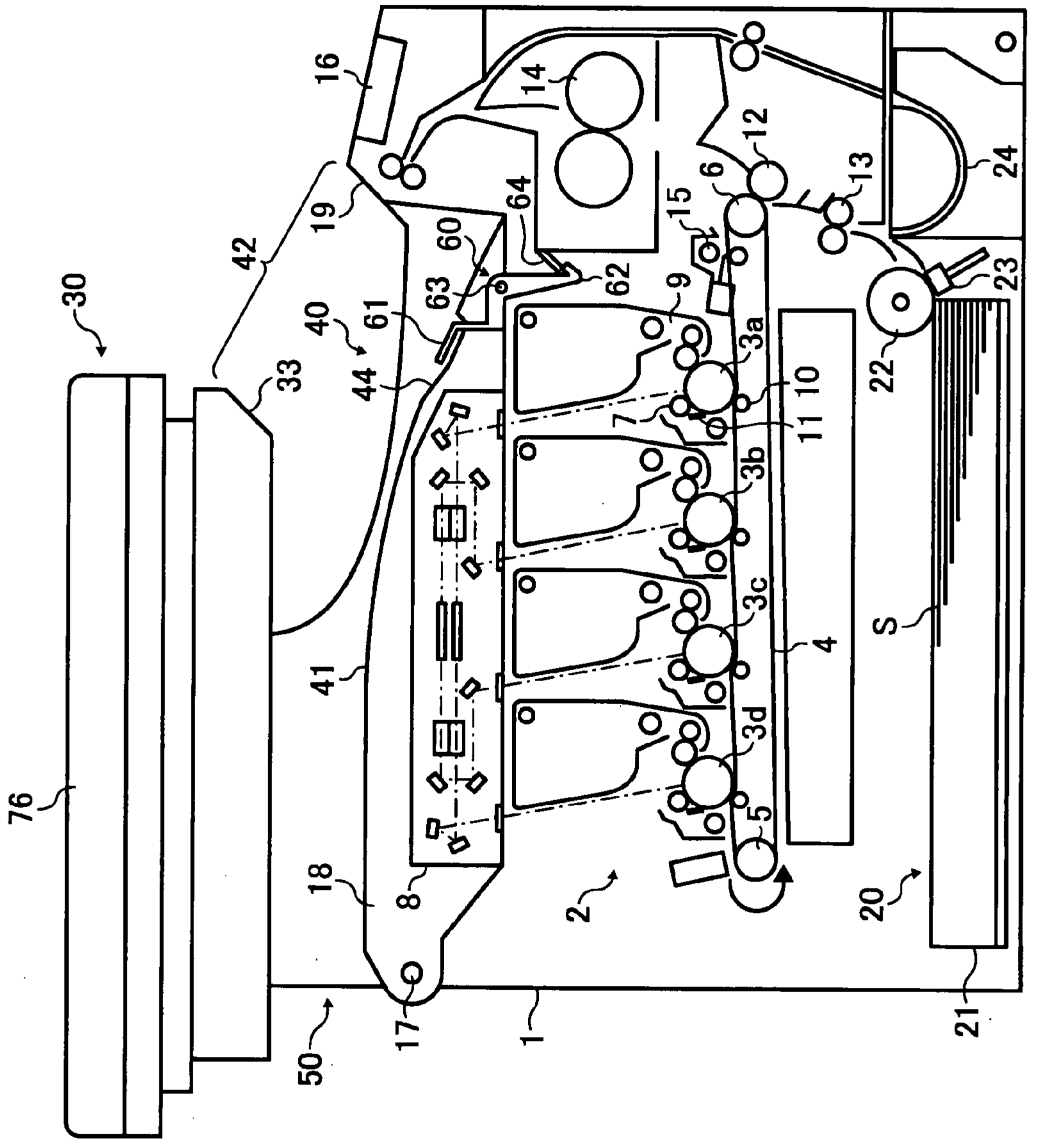
FIG. 2 is a detailed schematic side view of the image forming apparatus.

FIG. 1 is a perspective view of an image forming apparatus according to an embodiment of the present invention. FIG. 2 is a detailed schematic side view of the image forming apparatus.

The image forming apparatus according to the embodiment is a tandem-type color image forming apparatus with a scanner. The image forming apparatus includes an apparatus body 1, an image forming unit 2, a sheet feeding unit 20, and an image reading device 30. The image forming unit 2 is housed in the apparatus body 1 at the center of the apparatus body 1. The sheet feeding unit 20 is located below the image forming unit 2 and feeds sheets on each of which an image is to be formed by the image forming unit 2. The image reading device 30 is located above the image forming unit 2 and serves as the scanner.

The image forming unit 2 includes a plurality of photoreceptors 3*a*, 3*b*, 3*c* and 3*d* that are drum-shaped and each serve as an image carrier. Images of different colors are formed on the photoreceptors 3*a* to 3*d*. In the image forming apparatus shown in FIG. 2, each of yellow, cyan, magenta, and black toner images is formed on each of the surfaces of the photoreceptors 3*a* to 3*d*. The photoreceptors 3*a* to 3*d* are arranged parallel and separate from one another at predetermined intervals. Below the photoreceptors 3*a* to 3*d*, an intermediate transfer belt 4 is arranged as an intermediate transfer medium so as to face the photoreceptors 3*a* to 3*d*. Although a drum can be used as an intermediate transfer medium, the intermediate transfer belt 4 is explained as an endless belt that extends around a plurality of supporting rollers 5 and 6. The intermediate transfer belt 4 is driven in the direction indicated by the arrow shown in FIG. 2.

The image forming unit 2 also includes, around the photoreceptors 3, chargers 7, an optical scanning unit (laser scanning unit) 8, developing units 9, transferring units 10, and cleaning units 11. The chargers 7 charges surfaces of the photoreceptors 3. The optical scanning unit 8 applies a laser beam based on information on an image to each of the surfaces of the photoreceptors 3. The developing units 9 each visualize a latent image formed by irradiation on the surface of a corresponding one of the photoreceptors 3. The transferring units 10 each face a corresponding one of the photoreceptors 3 with the intermediate transfer belt 4 in between. The cleaning units 11 each remove and collect residual toner on the surface of a corresponding one of the photoreceptors 3 after the latent image is transferred onto the intermediate transfer belt 4.

To form an image, first, the photoreceptor 3 is driven to rotate clockwise in FIG. 2, and the charger 7 charges the surface of the photoreceptor 3 to a predetermined polarity. Subsequently, the optical scanning unit 8 applies a laser beam based on information on an image to the charged surface, and accordingly, a latent image is formed on the surface of the photoreceptor 3. The latent image is then visualized as a toner image by the developing unit 9, and the resultant toner image is transferred to the intermediate transfer belt 4 by the transferring unit 10.

To form a color image, the above operation is performed on each of the photoreceptors 3 to form yellow, cyan, magenta, and black toner images on the photoreceptors 3*a* to 3*d*. The color toner images are sequentially transferred to the intermediate transfer belt 4 and overlap thereon. The image forming unit 2 further includes a secondary transfer roller 12 opposing a supporting roller 6 with the intermediate transfer belt 4 in between.

Figure 10:
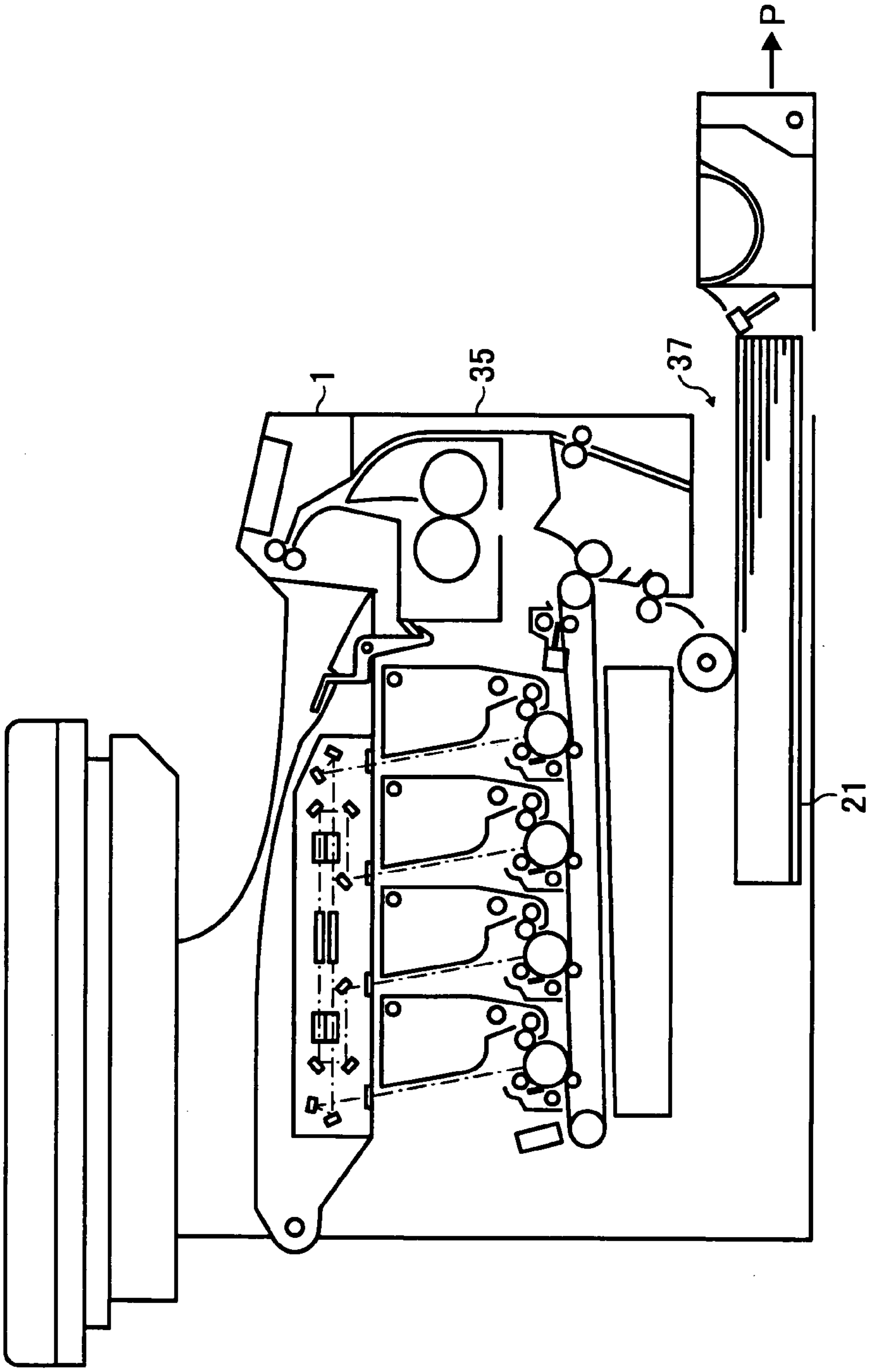
FIG. 10 is a vertical cross section of the image forming apparatus in the state where a part of the front cover is opened.

The sheet feeding unit 20 includes a sheet tray 21, a sheet feeding roller 22, a friction pad 23, and a re-transferring path 24. The sheet tray 21 serves as a sheet housing unit for stacking sheets S such as transfer paper sheets or resin films. The sheet feeding roller 22 feeds the stacked sheets S from the sheet tray 21 one by one. The friction pad 23 serves as a separation unit that separates a plurality of overlapping sheets S fed from the sheet tray 21. The re-transferring path 24 is used for duplex printing. As shown in FIG. 10, the sheet tray 21 can be pulled out of the apparatus body 1 in a direction indicated by the arrow P to replenish the sheets S on the sheet tray 21. When the sheet tray 21 is pulled forward, the friction pad 23 and the re-transferring path 24 are pulled out of the apparatus body 1 with the sheet tray 21; however, the sheet feeding roller 22 remains inside the apparatus body 1.

The sheet S fed by the sheet feeding unit 20 is transferred towards resist rollers 13, and the edge of the sheet touches the resist rollers 13 at rest so that the sheet S can be in an adjusted position. Thereafter, the resist rollers 13 restart rotating to send the sheet S to a secondary transfer unit including the secondary transfer roller 12 such that the color toner image formed on the intermediate transfer belt 4 and the sheet S overlap appropriately at the secondary transfer unit.

The sheet S on which the toner image is transferred by the secondary transfer unit is transferred to a fixing unit 14, and the fixing unit 14 fixes the unfixed toner image. Thereafter, the sheet S is discharged to a sheet stacking unit 40 above the apparatus body 1. After the transfer of the toner image, a belt cleaner 15 removes the residual toner on the surface of the intermediate transfer belt 4.

Figure 3:
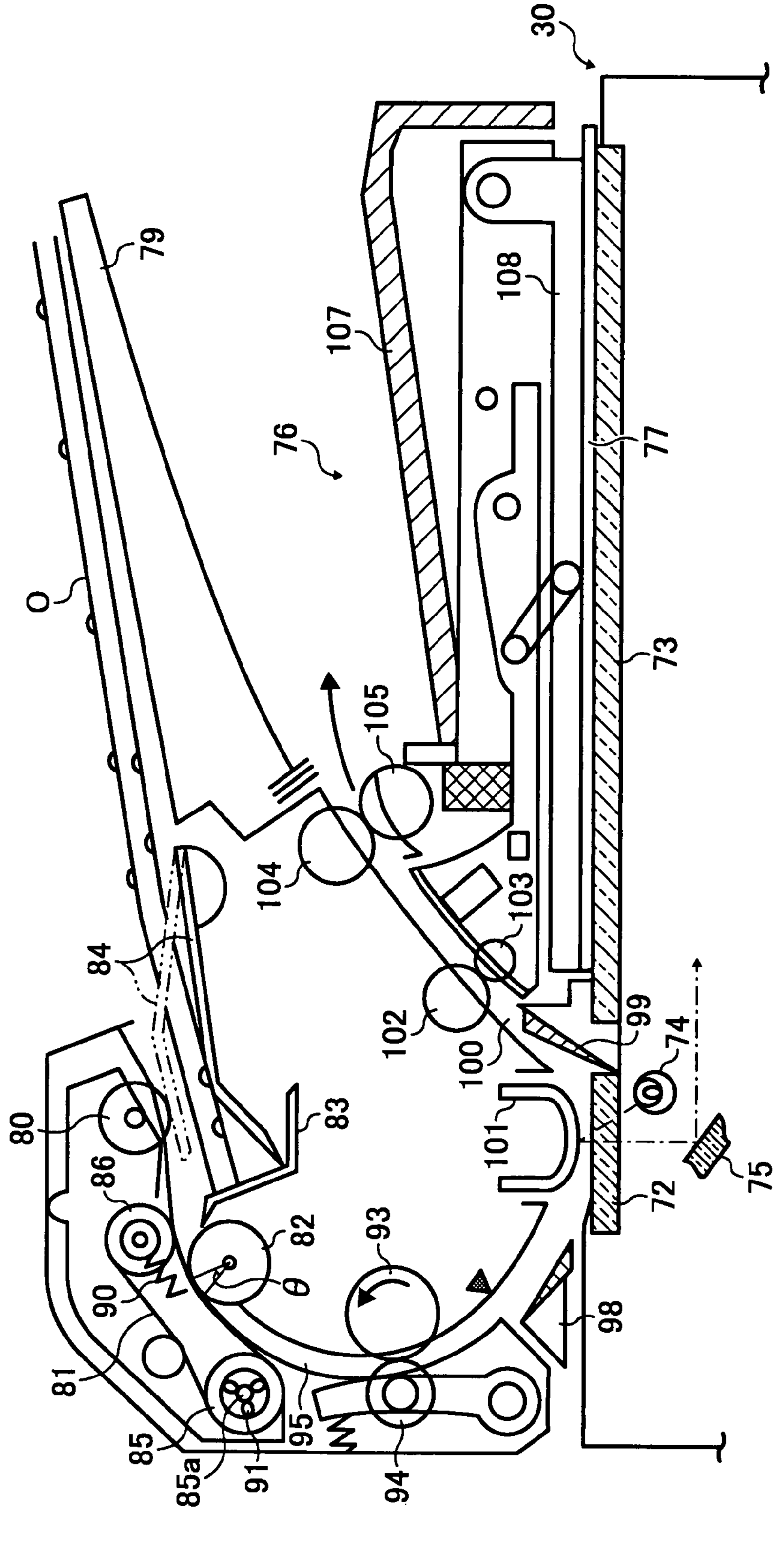
FIG. 3 is a detailed schematic side view of an auto document feeder and an image reading device shown in FIG. 2.
Figure 4:
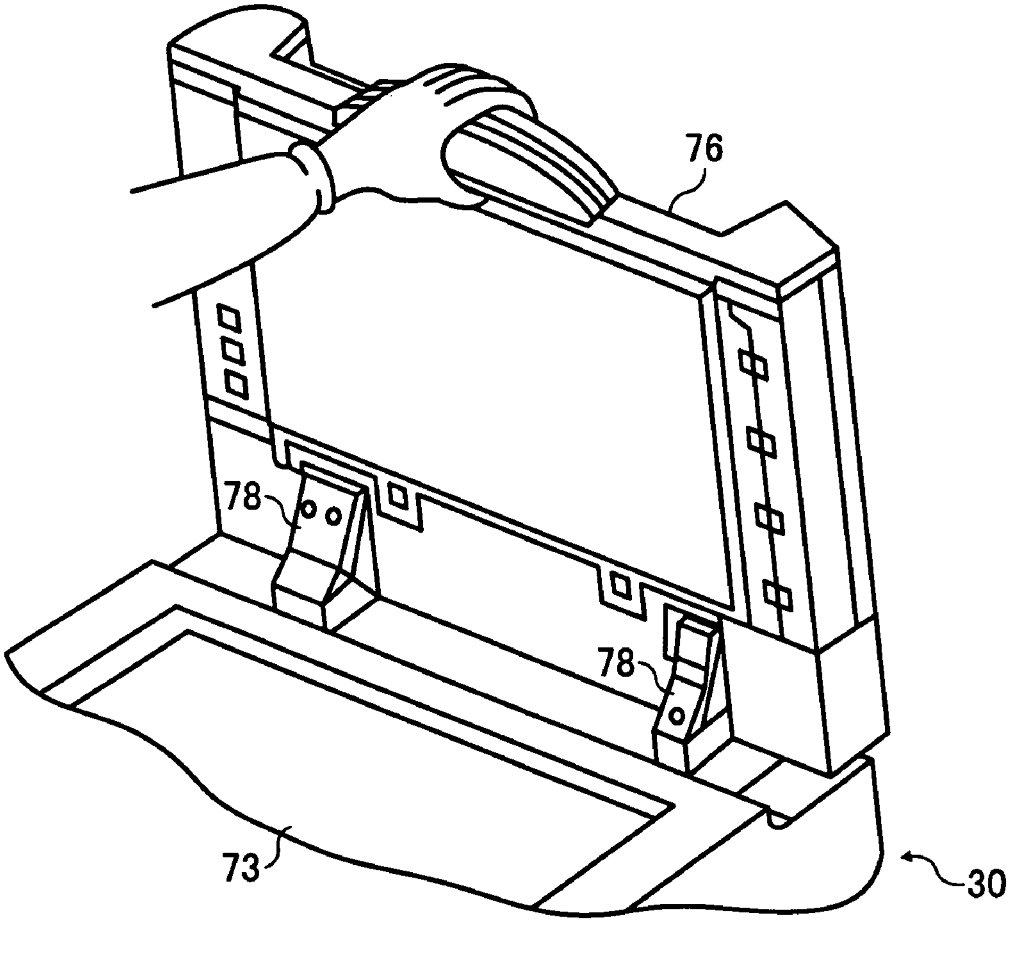
FIG. 4 is a perspective view of the image reading device that is opened.

The image reading device 30 is described below with reference to FIG. 3.

On the upper surface of the image reading device 30, a slit glass (a first reading position) 72 and a contact glass (a second reading position) 73 are provided. Below the slit glass 72 and the contact glass 73, an exposing lamp 74 and a first mirror 75 that serve as an image reading unit are provided. To read an original sheet on the contact glass 73, the exposing lamp 74 and the first mirror 75 move from left to right in FIG. 3 (a first reading mode). To read an original sheet on the slit glass 72, the exposing lamp 74 and the first mirror 75 stay still below the slit glass 72. After the surface of the original sheet is read with the exposing lamp 74 (a second reading mode), reflected light beams focus on an image forming element such as a charge-coupled device (CCD) via the first mirror 75 and lenses (not shown) and an image is formed on the image forming element as heretofore known.

On the image reading device 30, an auto document feeder (hereinafter, "ADF") 76 is provided. The ADF 76 includes a reflection plate 77 that serves as reference white for white balance when the surface of an original sheet on the contact glass 73 is read, and that presses the original sheet against the contact glass 73. The ADF 76 is pivotally attached to the image reading device 30 with hinges 78 so as to open and close with respect to the image reading device 30.

On the ADF 76, a sheet table 79 for placing a sheet stack O of a plurality of original sheets is provided. After the sheet stack O is fed by an introducing roller 80 configured to be in contact with and separate from the sheet stack O, the original sheets of the sheet stack O are separated one by one by a separation belt 81 and a separation-preventing roller 82. The separation belt 81 presses and contacts the separation-preventing roller 82 at a certain angle θ.

The separation belt 81 extends around a driving roller 85 and a driven roller 86. The driven roller 86 is biased by a spring 90, and thus, a certain tensile force is applied to the separation belt 81. A one-way clutch 91 that rotates the driving roller 85 clockwise in FIG. 1 is provided between the driving roller 85 and a shaft 85*a*. The separation belt 81 rotates clockwise in FIG. 1 as well. In this manner, the top original sheet of the sheet stack O between the separation belt 81 and the separation-preventing roller 82 is separated from other original sheets.

The separated original sheet is reversed by a first transferring roller 93 and a driven roller 94 that the first transferring roller 93 drives, and transferred along a reversing path 95 to the slit glass 72.

The original sheet is transferred by the first transferring roller 93 and the driven roller 94 to the slit glass 72 while being held by them, and transferred to a sheet-discharging path 100 by a reversed sheet guide 99 such that the original sheet is lifted up. Above the slit glass 72 is arranged a reflection guide plate 101 that serves as reference white for white balance when an image is read from an original sheet on the slit glass 72.

After being transferred to the sheet-discharging path 100, the original sheet is transferred by a second transferring roller (driving member) 102 and a driven roller (transferring member) 103 that the second transferring roller 102 drives while being held by them. The original sheet is then held by a sheet-discharging roller 104 and a driven roller 105 that the sheet-discharging roller 104 drives, and discharged to the outside and an exterior cover 107. A pressing plate 108 is provided on the reflection plate 77 that covers the contact glass 73 when the ADF 76 is closed. The pressing plate 108 presses an original sheet on the contact glass 73 against the contact glass 73.

The operation of the ADF 76 is explained below. The sheet stack O is placed on the sheet table 79 such that surfaces of the original sheets, each having an image, face upward. Once a start button is pressed, a pressing plate 84 presses the sheet stack O against the introducing roller 80 so that the introducing roller 80 transfers the sheet stack O to the separation belt 81. The separation belt 81 and the separation-preventing roller 82 separate the top original sheet from other original sheets. The separated original sheet is then transferred to the slit glass 72 through the first transferring roller 93 and the driven roller 94 along the reversing path 95. The image on the surface of the original sheet is read by the exposing lamp 74, the first mirror 75, and the like. After the image is read, the original sheet is transferred on the sheet-discharging path 100 by the second transferring roller 102 and the driven roller 103, and discharged to the exterior cover 107 by the sheet-discharging roller 104 and the driven roller 105.

The image reading device 30 is supported above the apparatus body 1 by a supporting unit 50, described below, located between them. A control panel 16 for controlling the image reading device 30 and the image forming unit 2 is provided on one side of the image forming apparatus and this side is regarded as the front side of the image forming apparatus. Original sheets are transferred and scanned from left to right viewed from the front side of the image forming apparatus. From the front side of the image forming apparatus, a user operates the image reading device 30, in other words, the user sets the original sheets or removes the read original sheets. The sheets S are discharged from the front side to the back side of the image forming apparatus, in other words, to the sheet stacking unit 40.

Above the apparatus body 1, an upper frame 18 is provided as an upper frame member. The upper frame 18 supports an upper cover that serves as a sheet stacking surface 41 of the sheet stacking unit 40. The supporting unit 50, including two supporting members 51 and 52 provided along left and right edges of the upper frame 18, supports the image reading device 30 on the upper frame 18. Because no supporting member is provided near the back edge of the upper frame 18, even a long sheet with a length longer than the front-to-back length of the sheet stacking surface 41 can be kept on the sheet stacking surface 41 in a way that a part of the long sheet hangs out of the sheet stacking surface 41 to the back side. The image reading device 30 positioned above the sheet stacking unit 40 leads to less light thrown on the sheet stacking surface 41. In the image forming apparatus according to the embodiment, however, more light can be thrown on the sheet stacking surface 41 because no supporting member is provided to the back edge.

The upper frame 18 supports the optical scanning unit 8 that is positioned below the upper frame 18 and that is a part of the image forming unit 2. The upper frame 18 is swingable upward on hinges 17 on the back edge of the image forming apparatus so as to open and close. By the operation on the front side of the image forming apparatus, the upper frame 18 and the ADF 76 pivot about a pivot axis provided on the back side of the image forming apparatus to open and close.

Figure 5:
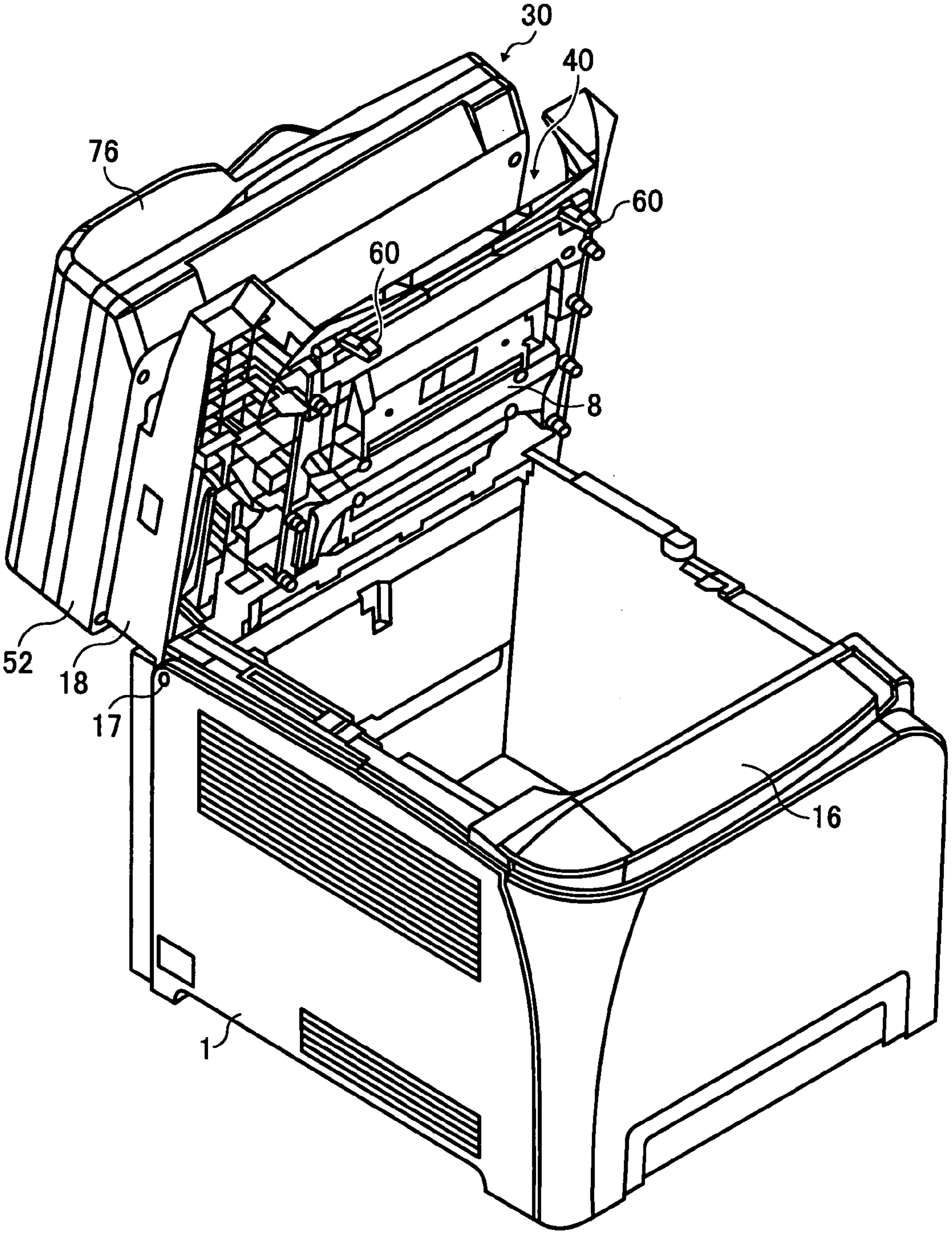
FIG. 5 is a perspective view of the image forming apparatus whose upper frame is opened.
Figure 8:
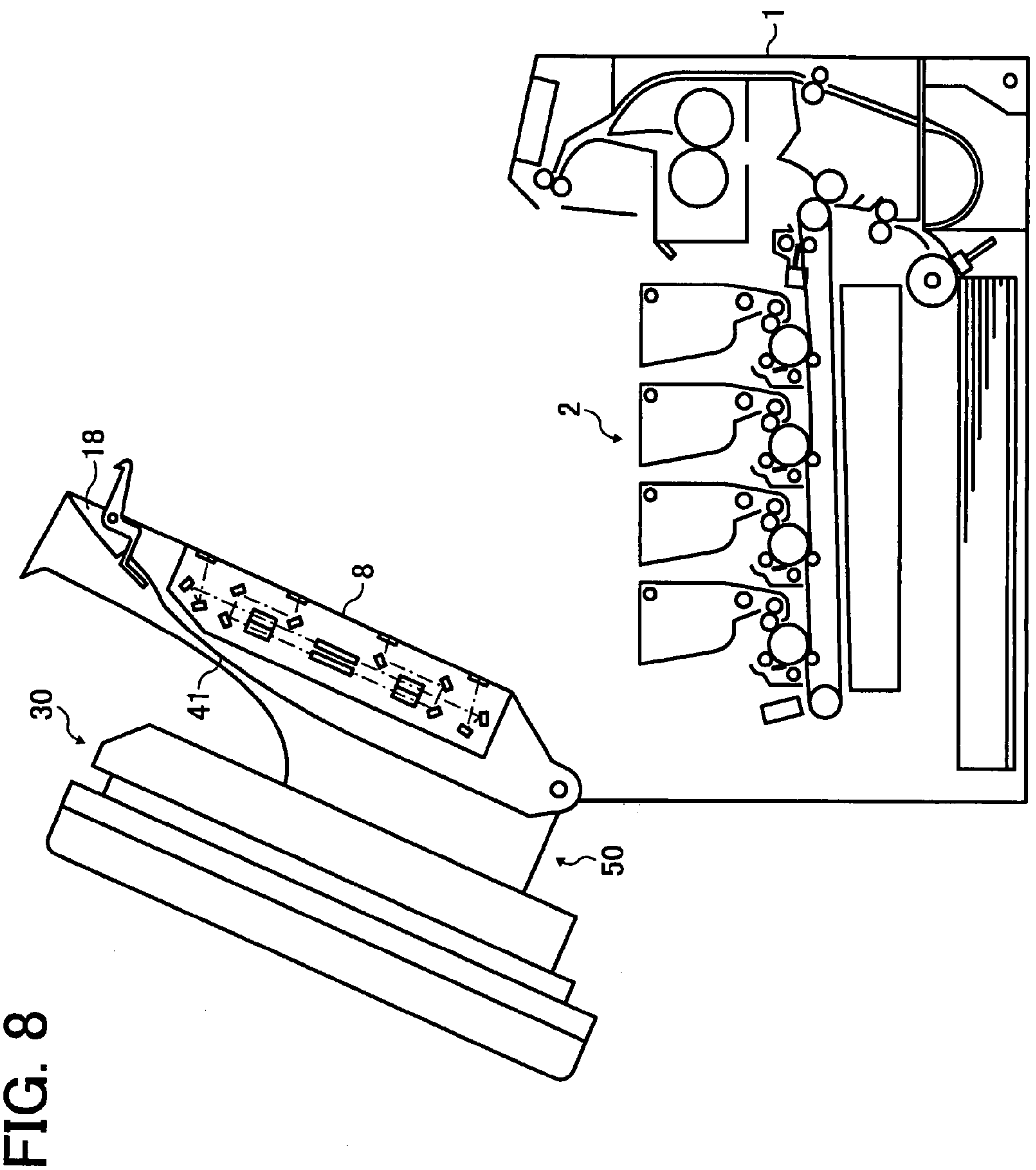
FIG. 8 is a vertical cross section of the image forming apparatus whose upper frame is opened.

Lock levers 60 described below that serve as a locking unit lock the upper frame 18 to the apparatus body 1. Once the lock levers 60 unlock the upper frame 18 from the apparatus body 1, the upper frame 18 can be opened along with the upper frame 18, the optical scanning unit 8 below the upper frame 18, the image reading device 30, and the supporting members 51 and 52 that support the image reading device 30 as shown in FIGS. 5 and 8. Accordingly, the user can access easily the image forming unit 2 and perform maintenance work easily. FIG. 5 depicts the state where relevant units of the image forming unit 2, such as the photoreceptors 3, the chargers 7, the developing units 9, and the cleaning units 11, are taken out of the apparatus body 1 from the opened portion of the apparatus body 1.

When the upper frame 18 is opened, the back edge of the sheet stacking surface 41 faces downward. In other words, if the sheets S are stacked and left on the sheet stacking surface 41 and the upper frame 18 is mistakenly opened, the sheets S fall off the back edge of the sheet-stacking surface 41. The sheet S can be prevented from falling off by providing the supporting unit 50 to the back edge of the upper frame 18. However, a long sheet touches the supporting unit 50 on the back edge of the upper frame 18, and the sheets S cannot be stacked properly.

To stack the sheets S properly on the sheet stacking surface 41, an operation unit 61 that releases the lock levers 60 to allow the upper frame 18 to swing is provided on the sheet stacking surface 41 in a position where the stacked sheets S cover the operation unit 61. The lock levers 60 each have the operation unit 61 on one end and a lock claw 62 on the other end. The lock claw 62 is engaged with a projection 64 of the apparatus body 1. The lock lever 60 pivots on a pin 63. The operation unit 61 is plate-shaped and extends along the sheet stacking surface 41. A recess portion 44 is formed on the sheet stacking surface 41 that is fan-shaped and allows a user to operate the operation unit 61. To open the upper frame 18, the user inserts the hand from the recess portion 44 and upholds the operation unit 61 so that the lock levers 60 pivot on the pins 63 clockwise and the lock claws 62 are disengaged from the projections 64. Thereafter, the operation unit 61 is upheld more so that the upper frame 18 swings on the hinges 17 in the same direction in which the ADF 76 swings.

Because the operation unit 61 is positioned on the sheet stacking surface 41 on which the sheets S are stacked, the user notices the presence of the sheets S when opening the upper frame 18. In this manner, the upper frame 18 can be prevented from being opened when the sheets S are stacked on the sheet stacking surface 41.

In the image forming apparatus that includes the image reading device 30 positioned above the sheet stacking unit 40, compared with the case where the image reading device 30 is not positioned above the sheet stacking unit 40, a user cannot see easily the sheet stacking unit 40 and take easily the sheets S from the sheet stacking unit 40. To solve the above inconvenience, as shown in FIG. 1, an opening portion 42 is largely formed between, the image reading device 30 and the apparatus body 1 on the front side of the image forming apparatus according to the embodiment. The width of the opening portion 42 is larger than that of the sheets S discharged to the sheet stacking surface 41, and hence, the sheets S can be taken from the sheet stacking surface 41 easily. Furthermore, a first tapered portion 33 is formed at a lower corner of the image reading device 30 on its front side and a second tapered portion 19 is formed in an upper portion of the control panel 16 such that the space of the opening portion 42 increases. Specifically, the second tapered portion 19 is tapered such that the space of the opening portion 42 increases towards the outside, allowing the user to insert the hand easily into the opening portion 42 to take the sheets S from the sheet stacking surface 41. The first tapered portion 33 can be tapered as above, or the first and second tapered portions 33 and 19 can be in any shape as long as increasing the space of the opening portion 42.

The accessibility to the sheets S is explained below.

A cutout portion 43 having a surface lower than the sheet stacking surface 41 is formed in an upper-right portion of the sheet stacking unit 40 to improve the accessibility to the sheets S on the sheet stacking surface 41. The right portion of the cutout portion 43 has a surface that slopes upward towards the upstream in a direction in which a sheet is discharged from the image forming unit 2. In addition to the opening portion 42, the cutout portion 43 allows a user whose hands are large to take easily the sheets S from a side of the image forming apparatus. Although the cutout portion 43 of the embodiment is formed on the upper-right portion, the cutout portion 43 can be formed on an upper-left portion to obtain the same effect.

Figure 6:
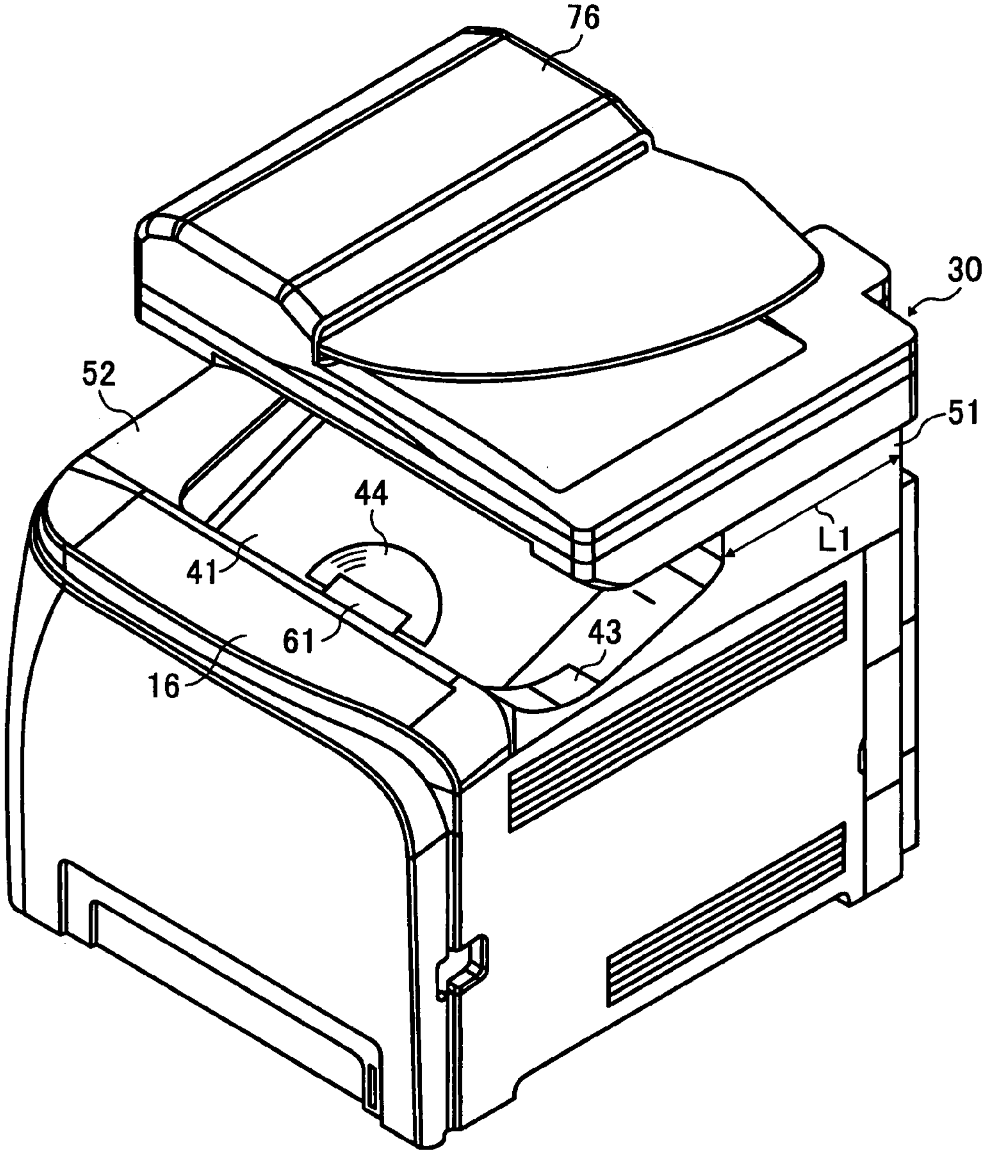
FIG. 6 is a perspective view of the image forming apparatus.
Figure 7:
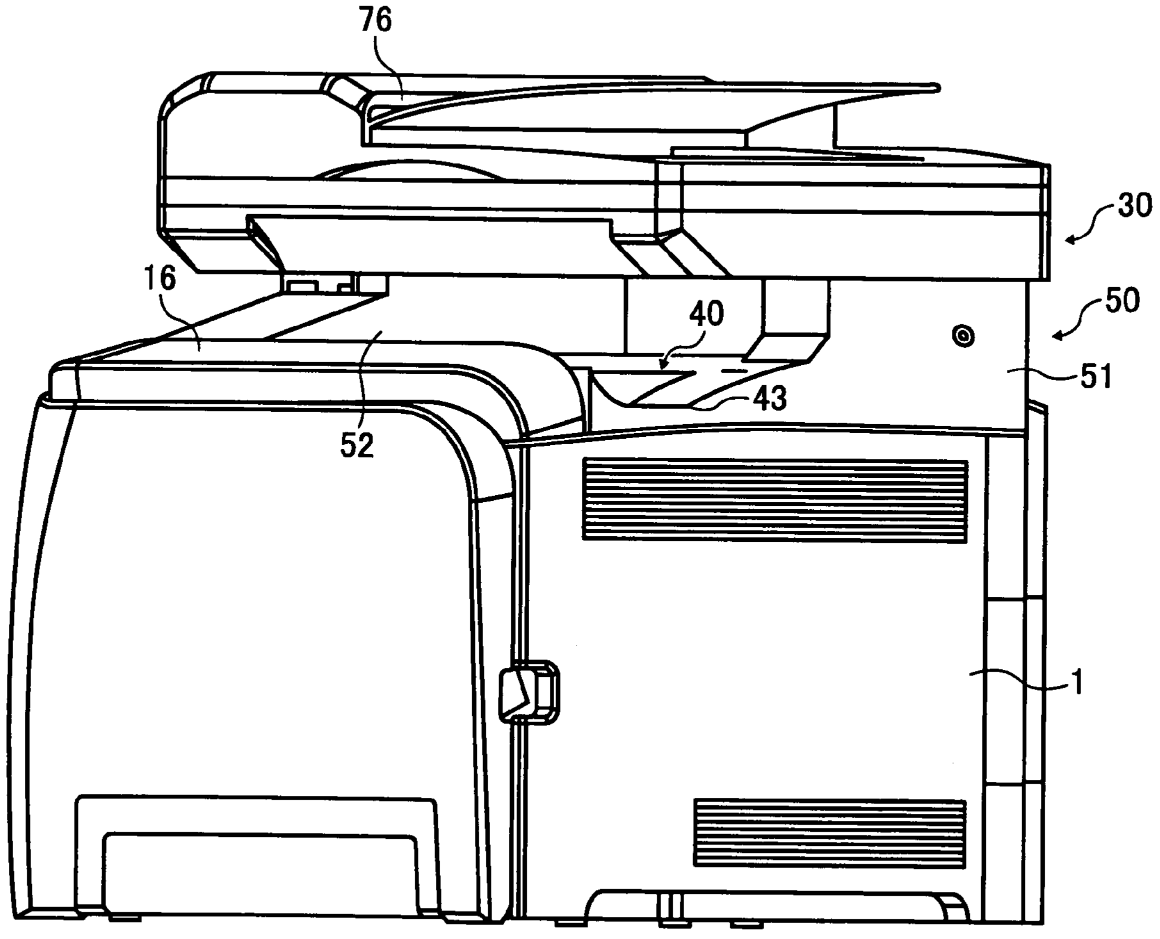
FIG. 7 is a perspective view of the image forming apparatus.

As shown in FIG. 7, the supporting members 51 and 52 are asymmetrical. The supporting member 52 (on right side viewed from the front) corresponding to the cutout portion 43 has a length smaller than that of the supporting member 51 (on left side viewed from the front) in the front-to-back direction. Specifically, the length L1 of the supporting member 51 shown in FIG. 6 and the length L2 of the supporting member 52 shown in FIG. 1 satisfies L1<L2. With this configuration, the sheets S can be taken easily from the sheet stacking surface 41. Furthermore, the light is thrown from the cutout portion 43 so that the sheets S on the sheet stacking surface 41 can be seen well. Although the ADF 76 having a certain weight is arranged on the supporting unit 50, the strength of the supporting unit 50 can be assured because the supporting member 52 has the larger length and supports the ADF 76.

The recess portion 44 allows the user to easily hold the operation unit 61, and provides a space such that the user can insert fingers into the space to take the sheets S. Because each sheet S is discharged in a way that the center line of the sheet matches a reference center line, the recess portion 44 is formed to be symmetrical with respect to the reference center line. Because the width of the recess portion 44 is larger than that of each sheet to be used in the image forming apparatus, the user can insert the fingers into the recess portion 44 to pick up a discharged sheet S in a size of, for example, a post card from the sheet stacking surface 41.

The lock levers 60 are explained in detail.

On the sheet stacking surface 41, the operation unit 61 is arranged on a portion whose surface slopes such that the sheet stacking surface 41 receives discharged sheets S. The operation unit 61 has an upper surface not higher than that of the sheet stacking surface 41. Hence, when the discharged sheet S slides down on the sloping surface, the trailing edges of the sheets S are prevented from touching the operation unit 61 and from being stacked in different positions. To achieve the same effect, alternatively, the operation unit 61 can be provided to a portion of the sheet stacking surface 41 on the downstream side, in the direction in which the sheet S is discharged, of the portion where the trailing edge of the sheet s arrives. For an image forming apparatus in which the sheet S falls on the sheet stacking surface 41 by self weight, the operation unit 61 can be provided near a discharging port from which the sheet S is discharged.

As shown in FIGS. 1 and 6, the operation unit 61 can be seen easily from the front side of the image forming apparatus because the operation unit 61 is provided on the sloping surface in a position at the front of the front edge of the image reading device 30. When the discharged sheet S is on the sheet stacking surface 41, the operation unit 61 can be seen once the discharged sheet S is taken from the sheet stacking surface 41.

The image forming unit 2 and the image reading device 30 (the ADF 76) are arranged such that the direction in which the sheet S is discharged from the image forming unit (from the front side to the back side of the image forming apparatus) is perpendicular to the sub-scanning direction (the direction in which an original sheet is transferred) of the image reading device 30. As shown in FIG. 2, the front face of the apparatus body 1 is at the front of the image reading device 30 and the supporting unit 50, and the control panel 16 is on the upper-front portion of the apparatus body 1. Because of the structure, the space of the opening portion 42 can be sufficiently large so that a short discharged sheet and the operation unit 61 can be seen easily from an upper point and that the operability of the operation unit 61 improves.

Figure 9:
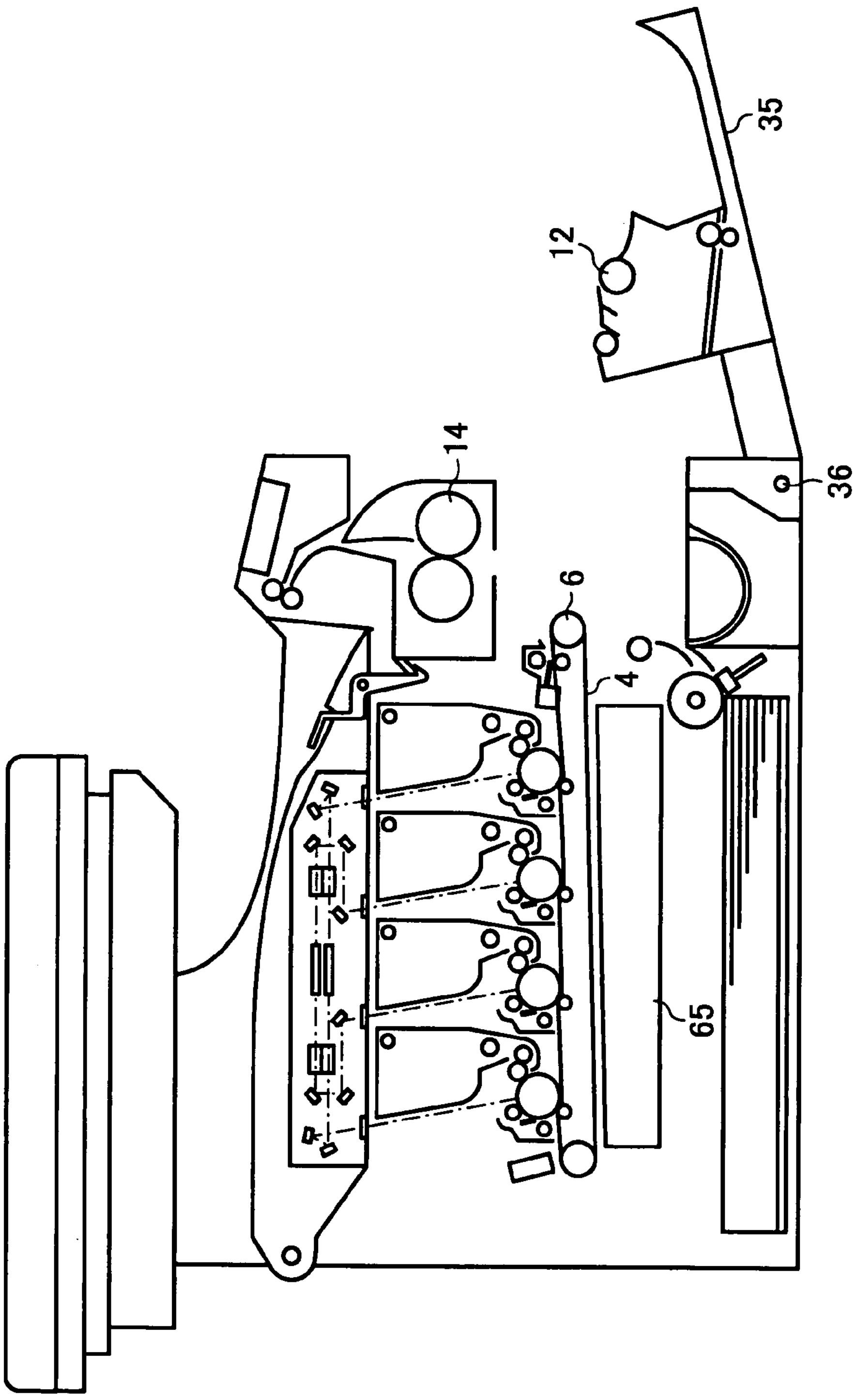
FIG. 9 is a vertical cross section of the image forming apparatus whose front cover is opened.

As shown in FIG. 9, a front cover 35 is pivotally attached to the apparatus body 1 with hinges 36 so as to close and open with respect to the apparatus body 1. By opening the front cover 35, the user can perform maintenance, such as replacement, of the units of the intermediate transfer belt 4, a used-toner bottle 65 and the fixing unit 14, and can remove a jammed sheet in the sheet transfer path inside the apparatus body 1.

As shown in FIG. 10, the front cover 35 has an opening 37 for inserting the sheet tray 21 into the apparatus body 1. The sheet tray 21 can be attached to and detached from the apparatus body 1 and pulled to the front side of the image forming apparatus via the opening 37. Thus, the user can perform the maintenance and replacement of the parts as well as fixing paper jam from the front side of the apparatus body 1. Hence, a space for performing such operations is unnecessary on the back side, and the area in which the apparatus is installed can be reduced. This leads to provision of a low-cost apparatus having excellent usability.

In the image forming apparatus according to the embodiment, a user can take easily the sheets S from the sheet stacking unit 40 and operates easily the ADF 76 from the front side. Furthermore, the user can perform the operations such as fixing of paper jam and the maintenance and the replacement of the units inside the apparatus body 1 from the front side. For this reason, even if a user cannot access the back, right, and left sides of the image forming apparatus because of a location in which the image forming apparatus is installed, the user can use image forming apparatus sufficiently and the maintenance thereof can be sufficiently performed as well.

According to an aspect of the present invention, the sheets can be prevented from falling off the image forming apparatus. Moreover, the operation unit can be seen well. Furthermore, sheets can be stacked appropriately. Thus, the operability of the image forming apparatus improves.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:

an apparatus body;

an image forming unit that forms an image on a recording medium, and that is housed in the apparatus body;

a frame member that is pivotally attached to the apparatus body so as to pivot between a closed position and an open position, the frame member closing the apparatus body in the closed position and exposing the image forming unit from the apparatus body in the open position;

a reading unit that reads an original image, and that is located above the apparatus body;

a stacking member that has a stacking surface for stacking recording media discharged from the image forming unit, and that is located between the apparatus body and the reading unit;

a locking member that locks the frame member to the apparatus body when the frame member is in the closed position; and an operation member that is configured to release the locking member to unlock the frame member from the apparatus body, and that is located on the stacking surface in a position where the stacked recording media covers the operation member, wherein the stacking surface includes a recess portion for inserting a finger to operate the operation member.

2. The image forming apparatus according to claim 1, wherein the stacking surface includes a sloped surface that slopes up in a direction in which the recording media are discharged from the image forming unit, the image forming apparatus further comprising:

a control panel that receives input to control the image forming unit and the reading unit, and that is located on a first side of the image forming apparatus, wherein an open space is defined by the stacking surface and the reading unit to allow the recording media discharged from the image forming unit to be taken from the stacking member, and is located on the first side, the recording media are discharged from the first side to a second side opposite to the first side, and the operation member is located on the sloped surface.

3. The image forming apparatus according to claim 1, wherein the reading unit has an edge that is recessed from an edge of the apparatus body, and the operation member is located upstream of the edge of the reading unit in a direction in which the recording media are discharged from the image forming unit.

4. The image forming apparatus according to claim 2, wherein the reading unit has an edge that is recessed from an edge of the apparatus body, and the operation member is located upstream of the edge of the reading unit in a direction in which the recording media are discharged from the image forming unit.

5. The image forming apparatus according to claim 1, wherein the operation member is located downstream, in a direction in which the recording media are discharged from the image forming unit, of a portion of the stacking surface on which a trailing edge of the recording media touches when the recording media are discharged to the stacking surface.

6. The image forming apparatus according to claim 2, wherein the operation member is located downstream, in a direction in which the recording media are discharged from the image forming unit, of a portion of the stacking surface on which a trailing edge of the recording media touches when the recording media are discharged to the stacking surface.

7. The image forming apparatus according to claim 1, wherein the image forming unit includes a discharging port that allows the recording media to be discharged to the stacking surface, and the operation member is located near the discharging port.

8. The image forming apparatus according to claim 1, wherein the image forming unit includes an optical scanning unit that irradiates an image carrier with light, and the reading unit and the optical scanning unit pivot along with the frame member when the frame member pivots to any one of the closed position and the open position.

9. The image forming apparatus according to claim 1, wherein the apparatus body includes a portion that is opened when the frame member is in the open position, and the image forming unit includes parts that are detachable from the apparatus body through the portion when the frame member is in the open position.

10. The image forming apparatus according to claim 1, further comprising:

a control panel that receives input to control the image forming unit and the reading unit, and that is located on a first side of the image forming apparatus;

a first supporting member that supports the image reading device from a third side of the image forming apparatus perpendicular to the first side; and a second supporting member that supports the image reading device from a fourth side opposite to the third side such that a space is formed between the image reading device and the stacking member, wherein the space is open on the first side and a second side opposite to the first side.

11. The image forming apparatus according to claim 10, wherein a length of the first supporting member in a direction in which the recording media are discharged from the image forming unit is smaller than a length of the second supporting member.

12. The image forming apparatus according to claim 11, wherein the stacking member includes a portion that is lower than other portions, and that is located on the third side.

13. The image forming apparatus according to claim 11, wherein the stacking member includes a portion that has a surface sloping down in a direction in which the recording medium is discharged from the image forming unit, and that is located on the third side.

14. An image forming apparatus, comprising:

an apparatus body;

image forming means for forming an image on a recording medium, which is housed in the apparatus body;

a frame member that is pivotally attached to the apparatus body so as to pivot between a closed position and an open position, the frame member closing the apparatus body in the closed position and exposing the image forming means from the apparatus body in the open position;

reading means for reading an original image, which is located above the apparatus body;

a stacking member that has a stacking surface for stacking recording media discharged from the image forming means, and that is located between the apparatus body and the reading means;

locking means for locking the frame member to the apparatus body when the frame member is in the closed position; and operation means for releasing the locking means to unlock the frame member from the apparatus body, which is located on the stacking surface in a position where the stacked recording media covers the operation means, wherein the stacking surface includes a recess portion for inserting a finger to operate the operation means.

15. The image forming apparatus according to claim 1, wherein the locking member includes the operation member on one end and a lock claw on the other end.

16. The image forming apparatus according to claim 14, wherein the locking means includes the operation means on one end and a lock claw on the other end.

17. An image forming apparatus, comprising:

an apparatus body;

an image forming unit that forms an image on a recording medium, and that is housed in the apparatus body;

a reading unit that reads an original image, and that is located above the apparatus body;

a frame member that is pivotally attached to the apparatus body so as to pivot between a closed position and an open position, the frame member closes the apparatus body in the closed position, and exposes the image forming unit from the apparatus body in the open position, and the frame member includes a stacking surface on which recording media discharged from the image forming unit are stacked and that is located between the apparatus body and the reading unit;

a locking member that locks the frame member to the apparatus body when the frame member is in the closed position; and an operation member that is configured to release the locking member to unlock the frame member from the apparatus body, and that is located on the stacking surface in a position where the stacked recording media covers the operation member, wherein the stacking surface includes a recess portion for inserting a finger to operate the operation member.

18. The image forming apparatus according to claim 17, wherein an end of the reading unit in a first direction opposite to a second direction in which the recording media are discharged from the image forming unit is located in the second direction relative to an end of the apparatus body in the first direction, and the operation member is located in the first direction relative to the end of the reading unit in the first direction.

19. An image forming apparatus, comprising:

an apparatus body;

an image forming unit that forms an image on a recording medium, and that is housed in the apparatus body;

a frame member that is pivotally attached to the apparatus body so as to pivot between a closed position and an open position, the frame member closing the apparatus body in the closed position and exposing the image forming unit from the apparatus body in the open position;

a reading unit that reads an original image, and that is located above the apparatus body;

a stacking member that has a stacking surface for stacking recording media discharged from the image forming unit, and that is located between the apparatus body and the reading unit;

a locking member that locks the frame member to the apparatus body when the frame member is in the closed position; and an operation member that is configured to release the locking member to unlock the frame member from the apparatus body, and that is located on the stacking surface in a position where the stacked recording media covers the operation member, wherein the stacking surface includes a recess portion for inserting a finger to operate the operation member, and the recess portion has a width larger than a width of the operation member.

20. The image forming apparatus according to claim 19, wherein the stacking surface includes a sloped surface that slopes up in a direction in which the recording media are discharged from the image forming unit, the image forming apparatus further comprising:

a control panel that receives input to control the image forming unit and the reading unit, and that is located on a first side of the image forming apparatus, wherein an open space is defined by the stacking surface and the reading unit to allow the recording media discharged from the image forming unit to be taken from the stacking member, and is located on the first side, the recording media are discharged from the first side to a second side opposite to the first side, and the operation member is located on the sloped surface.

21. The image forming apparatus according to claim 19, wherein the reading unit has an edge that is recessed from an edge of the apparatus body, and the operation member is located upstream of the edge of the reading unit in a direction in which the recording media are discharged from the image forming unit.

22. The image forming apparatus according to claim 20, wherein the reading unit has an edge that is recessed from an edge of the apparatus body, and the operation member is located upstream of the edge of the reading unit in a direction in which the recording media are discharged from the image forming unit.

23. The image forming apparatus according to claim 19, wherein the operation member is located downstream, in a direction in which the recording media are discharged from the image forming unit, of a portion of the stacking surface on which a trailing edge of the recording media touches when the recording media are discharged to the stacking surface.

24. The image forming apparatus according to claim 20, wherein the operation member is located downstream, in a direction in which the recording media are discharged from the image forming unit, of a portion of the stacking surface on which a trailing edge of the recording media touches when the recording media are discharged to the stacking surface.

25. The image forming apparatus according to claim 19, wherein the image forming unit includes a discharging port that allows the recording media to be discharged to the stacking surface, and the operation member is located near the discharging port.

26. The image forming apparatus according to claim 19, wherein the image forming unit includes an optical scanning unit that irradiates an image carrier with light, and the reading unit and the optical scanning unit pivot along with the frame member when the frame member pivots to any one of the closed position and the open position.

27. The image forming apparatus according to claim 19, wherein the apparatus body includes a portion that is opened when the frame member is in the open position, and the image forming unit includes parts that are detachable from the apparatus body through the portion when the frame member is in the open position.

28. The image forming apparatus according to claim 19, further comprising:

a control panel that receives input to control the image forming unit and the reading unit, and that is located on a first side of the image forming apparatus;

a first supporting member that supports the image reading device from a third side of the image forming apparatus perpendicular to the first side; and a second supporting member that supports the image reading device from a fourth side opposite to the third side such that a space is formed between the image reading device and the stacking member, wherein the space is open on the first side and a second side opposite to the first side.

29. The image forming apparatus according to claim 28, wherein a length of the first supporting member in a direction in which the recording media are discharged from the image forming unit is smaller than a length of the second supporting member.

30. The image forming apparatus according to claim 29, wherein the stacking member includes a portion that is lower than other portions, and that is located on the third side.

31. The image forming apparatus according to claim 29, wherein the stacking member includes a portion that has a surface sloping down in a direction in which the recording medium is discharged from the image forming unit, and that is located on the third side.

32. The image forming apparatus according to claim 19, wherein the locking member includes the operation member on one end and a lock claw on the other end.

33. An image forming apparatus, comprising:

an apparatus body;

image forming means for forming an image on a recording medium, which is housed in the apparatus body;

a frame member that is pivotally attached to the apparatus body so as to pivot between a closed position and an open position, the frame member closing the apparatus body in the closed position and exposing the image forming means from the apparatus body in the open position;

reading means for reading an original image, which is located above the apparatus body;

a stacking member that has a stacking surface for stacking recording media discharged from the image forming means, and that is located between the apparatus body and the reading means;

locking means for locking the frame member to the apparatus body when the frame member is in the closed position; and operation means for releasing the locking means to unlock the frame member from the apparatus body, which is located on the stacking surface in a position where the stacked recording media covers the operation means, wherein the stacking surface includes a recess portion for inserting a finger to operate the operation means, and the recess portion has a width larger than a width of the operation means.

34. The image forming apparatus according to claim 33, wherein the locking means includes the operation means on one end and a lock claw on the other end.

35. An image forming apparatus, comprising:

an apparatus body;

an image forming unit that forms an image on a recording medium, and that is housed in the apparatus body;

a reading unit that reads an original image, and that is located above the apparatus body;

a frame member that is pivotally attached to the apparatus body so as to pivot between a closed position and an open position, the frame member closes the apparatus body in the closed position, and exposes the image forming unit from the apparatus body in the open position, and the frame member includes a stacking surface on which recording media discharged from the image forming unit are stacked and that is located between the apparatus body and the reading unit;

a locking member that locks the frame member to the apparatus body when the frame member is in the closed position; and an operation member that is configured to release the locking member to unlock the frame member from the apparatus body, and that is located on the stacking surface in a position where the stacked recording media covers the operation member, wherein the stacking surface includes a recess portion for inserting a finger to operate the operation member, and the recess portion has a width larger than a width of the operation member.

36. The image forming apparatus according to claim 35, wherein an end of the reading unit in a first direction opposite to a second direction in which the recording media are discharged from the image forming unit is located in the second direction relative to an end of the apparatus body in the first direction, and the operation member is located in the first direction relative to the end of the reading unit in the first direction.

* * * * *